US005601673A

United States Patent [19]

Alexander

[11] Patent Number: 5,601,673

[45] Date of Patent: Feb. 11, 1997

[54] METHOD OF MAKING CERAMIC ARTICLE WITH CAVITY USING LTCC TAPE

[75] Inventor: John H. Alexander, Goletta, Calif.

[73] Assignee: Ferro Corporation, Cleveland, Ohio

[21] Appl. No.: 367,560

[22] Filed: Jan. 3, 1995

[51] Int. Cl.$^6$ ........ B32B 31/04; B32B 31/26

[52] U.S. Cl. ........ 156/89; 264/59; 264/63

[58] Field of Search ........ 156/89; 264/59, 264/61, 63

[56] References Cited

U.S. PATENT DOCUMENTS

| | | | |
|---|---|---|---|
| 3,679,950 | 7/1972 | Rutt | 317/258 |
| 3,725,186 | 4/1973 | Lynch | 156/89 X |
| 3,879,645 | 4/1975 | Rutt et al. | 317/258 |
| 3,965,552 | 6/1976 | Rutt | 29/25.42 |
| 4,030,004 | 6/1977 | Rutt | 361/313 |
| 4,071,880 | 1/1978 | Rutt | 361/309 |
| 4,353,957 | 10/1982 | Rutt et al. | 428/292 |
| 4,445,851 | 5/1984 | Scrantom et al. | 432/239 |
| 4,488,870 | 12/1984 | Scrantom et al. | 432/11 |
| 4,806,295 | 2/1989 | Trickett et al. | 264/59 |
| 4,814,030 | 3/1989 | Dubisson et al. | 156/89 |
| 4,972,579 | 11/1990 | Yajima | 264/59 X |
| 5,134,540 | 7/1992 | Rutt | 361/321 |
| 5,234,641 | 8/1993 | Rutt | 264/61 |
| 5,258,335 | 11/1993 | Muralidhar et al. | 501/20 |

OTHER PUBLICATIONS

Richerson, David W., Modern Ceramic Engineering: properties, processing, and use in design, 2nd ed., rev. and expanded, 1992, pp. 408–410 1992.

*Primary Examiner*—David A. Simmons
*Assistant Examiner*—M. Curtis Mayes
*Attorney, Agent, or Firm*—Rankin, Hill, Lewis & Clark

[57] ABSTRACT

The present invention provides a method for making a ceramic article having a cavity therein and at least one shelf portion protruding laterally into the cavity spaced from the cavity floor comprising the steps of constructing a laminated product using strips of tape comprising fusible ceramic particles and a binder, said strips being cut to predetermined dimensions and superposed so as to define a cavity with a floor and side walls, and with at least one horizontal shelf portion extending from a side wall into said cavity, the shelf portion being spaced above the floor; filling said cavity with a fugitive insert of multiple strips of tape to support the shelf portion; and firing the laminated product to fuse the particles and to burn off the fugitive insert to provide a ceramic article with a cavity and a shelf parallel to the cavity floor.

3 Claims, 2 Drawing Sheets

METHOD OF MAKING CERAMIC ARTICLE WITH CAVITY USING LTCC TAPE

FIELD OF INVENTION

This invention relates to the manufacture of ceramic articles and especially to ceramic articles constructed of strips of fusible dielectric tape laminated together to form a chambered or cavitated article. More particularly, the invention relates to a method of producing ceramic articles of the type described wherein a shelf or overhang is formed in a sidewall of the cavity spaced above the cavity floor. The shelf is formed from one or more layers of dielectric tape and the cavity is filled with an insert comprising laminations of plastic tape that burn away during firing.

BACKGROUND

Various types of modules and packages utilized in the electronics industry are often formed of a dielectric material such as a glass/ceramic composition. Typically, such modules and packages with internal chambers or cavities may be used for mounting semiconductor chips.

These modules and packages are often made using ceramic tape such as a low temperature co-fired ceramic (LTCC) dielectric tape.

When a ceramic article formed of layers of dielectric tape laminated together and provided with a cavity, is fired, some collapse or movement of the cavity wall will occur because the material tends to flow under pressure. Normally, an insert made of a suitable material is used to maintain the cavity during lamination. After lamination, the insert is removed and the laminate is fired.

In some instances, it is advantageous to have a shelf or overhang formed in a side wall of the cavity above and parallel to the cavity floor. Such a shelf is difficult to produce, however, due to the need to laminate tape layers and because during lamination, the shelf can easily be deformed or collapsed.

It will be apparent, that when a shelf or overhang is required, the use of an insert is not acceptable because removal of the insert would cause damage to the fired product.

The method of the present invention, however, reduces the difficulties indicated above and provides other features and advantages heretofore not obtainable.

SUMMARY OF THE INVENTION

The present invention provides an improved method for making a ceramic article from layers of LTCC tape, wherein the article has a cavity formed therein and a shelf or overhang extending inwardly into the cavity above the cavity floor. The method of the invention provides various distinct advantages. Specifically, it permits the assembly or laminating of the product in such a way that the laminations forming the shelf or overhang portion are supported during assembly and damage or collapse is prevented. Also, it permits the shelf or overhang to be supported during the initial portion of the firing process so that no flow or collapse will occur.

In accordance with the invention, the ceramic article with a cavity therein and at least one shelf or overhang that protrudes laterally into the cavity above the cavity floor is produced by the steps of:

1. Constructing a laminated product using strips of tape comprising fusible ceramic particles and a binder, said strips being cut to predetermined dimensions and superposed so as to define a cavity with a floor and sidewalls and with at least one horizontal shelf portion extending from a sidewall into the cavity;
2. Filling the cavity with layers of a fugitive insert material to support the shelf portion in its predetermined fixed position and to engage the sidewalls and floor of the cavity; and
3. Firing the laminated product to fuse the particles and burn off the fugitive insert material to provide a ceramic article with a cavity and a shelf parallel to the cavity floor.

The composition of the dielectric material and organic binder that form the fusible sheet (or what is often called a "green" dielectric tape) may include a variety of glass/ceramic dielectric materials. The product is usually the result of the grinding of the respective components to a fine powder and then mixing the respective powders with an organic binder to form a paste. The paste may then be applied or cast onto a flexible film backing or substrate such as "MYLAR" to facilitate handling. The green tape may easily be removed from the MYLAR backing when one wishes to employ the green tape.

The so-called "fugitive" insert is preferably formed of an evanescent material and may include, for example, a plastic-like tape made of the same material as the binder/plasticizer system used in the ceramic material or LTCC tape. Alternatively, an organic "flour" type material may be used and plasticized with a suitable material. This fugitive material burns away with little residue upon firing of the green dielectric tape.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DESCRIPTION OF THE PREFERRED EMBODIMENT

The invention will be described with reference to a ceramic article 10 that exemplifies the type of ceramic article that may be produced in accordance with the method of the invention. Ceramic article 10 may be utilized to form an electric device such as multichip modules or packages.

Figure 1:
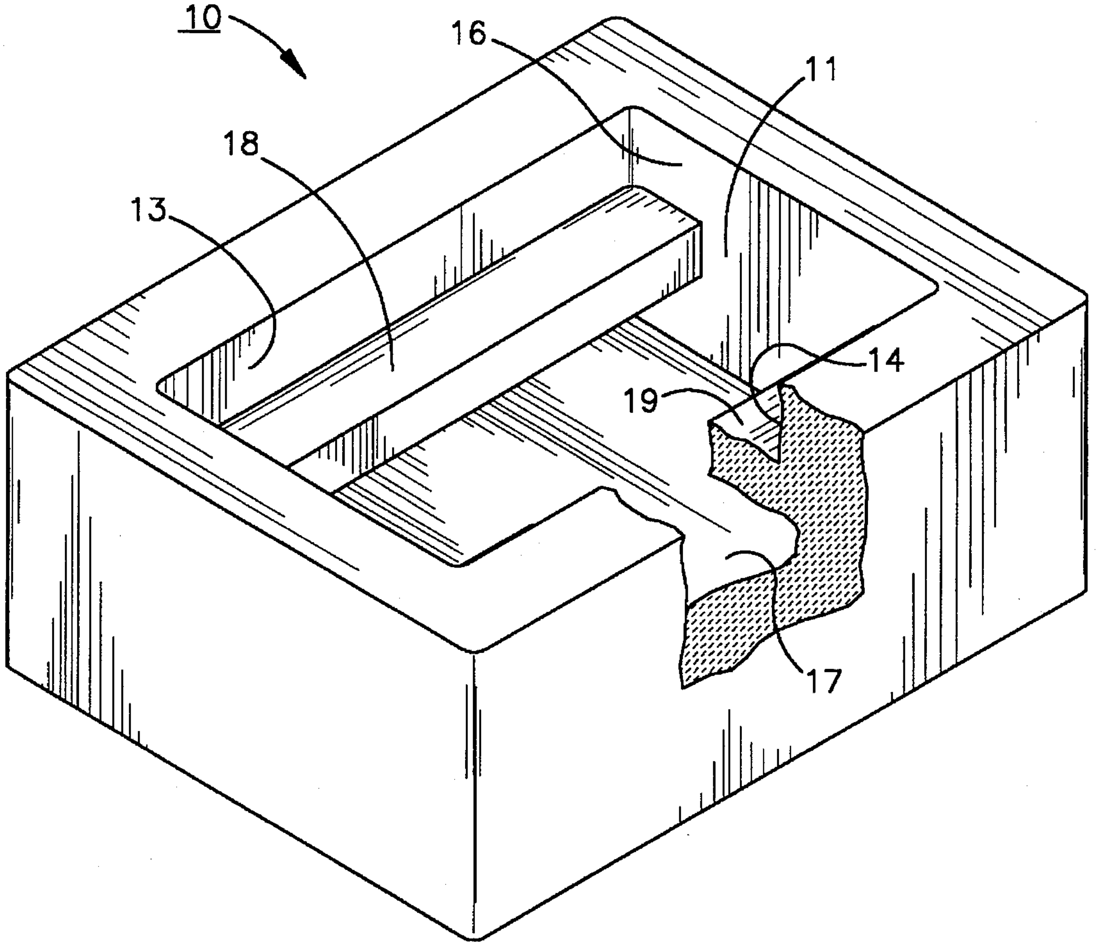
FIG. 1 is a perspective view of a ceramic article having a cavity with a protruding shelf or overhang and produced in accordance with the method of the invention.

Referring to FIG. 1, the article 10 has a generally polyhedral shape and a cavity 11 formed therein. The cavity has generally vertical side walls 13 and 14, end walls 15 and 16 and a generally rectangular floor 17. Also, shelves or overhangs 18 and 19 are formed in the side walls 13 and 14 spaced above the floor 17.

The Process

The method of the present invention is concerned with the construction of the shelves 18 and 19 which are located in the side walls 13 and 14 above the floor 17.

As indicated above, when the article is fabricated from sheets of dielectric tape which are cut to size and laminated to provide the desired dimensions for the article, the formation of a shelf or overhang presents unique problems. In particular, the use of an insert or core is prevented because it could not be removed after firing.

Figure 2:
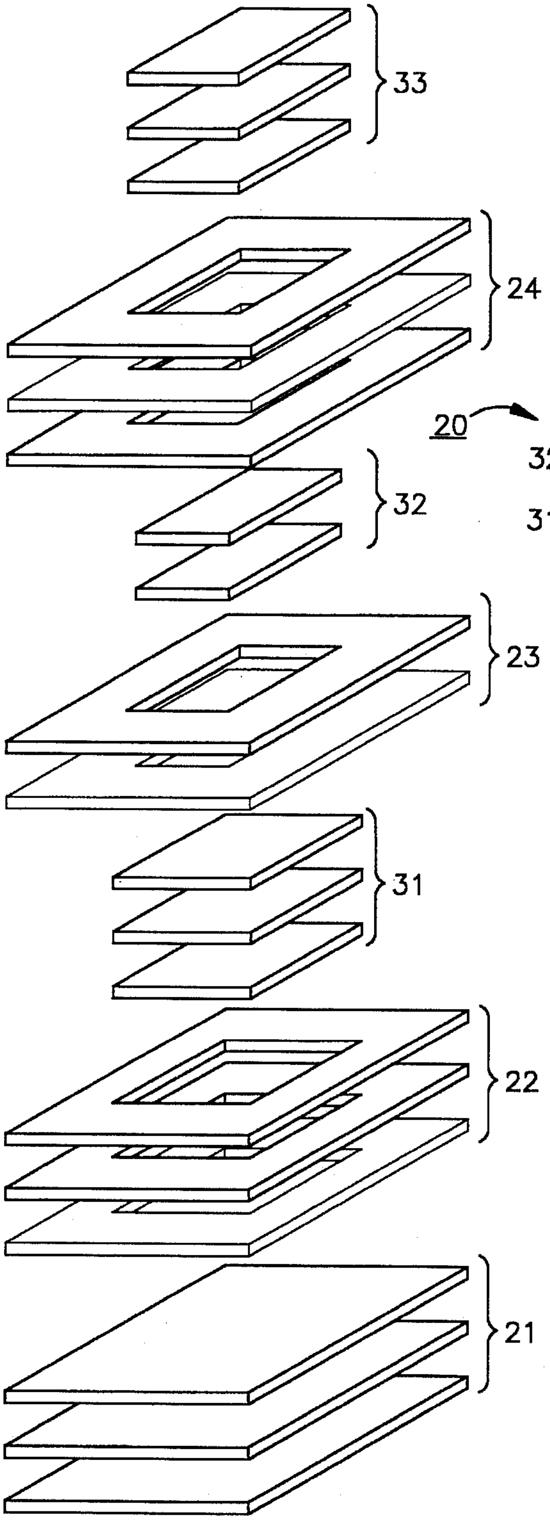
FIG. 2 is an exploded perspective view illustrating the construction of a raw or green ceramic article in accordance with the process of the invention.
Figure 3:
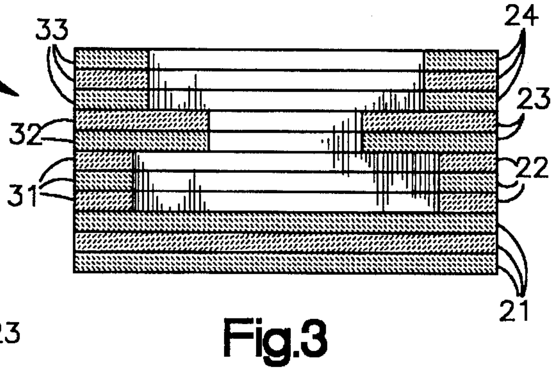
FIG. 3 is a sectional view of the raw or green ceramic article of FIG. 2.
Figure 4:
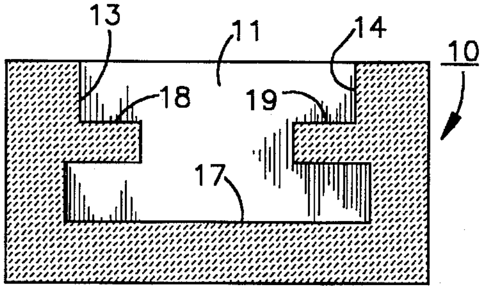
FIG. 4 is a sectional view of the ceramic article of FIG. 1, illustrating the resulting cavity with overhanging shelves formed in accordance with the method of the invention.

FIGS. 2 and 3 illustrate the laminating process in accordance with the invention to assure that the shelves 18 and 19 are not damaged or collapsed during the lamination process and also that they do not flow or collapse during firing.

In accordance with the method of the invention a raw or green laminate 20 is formed by assembling precut sheets of green LTCC dielectric tape including base layers 21, lower cavity layers 22 (which are provided with cut-outs or openings to form a cavity) intermediate cavity layers 23 (which are provided with openings of a reduced size to form the shelf portions) and upper layers 24 which are also provided with cut-outs or openings to form the upper portion of the cavity 11. The lower cavity layers have cut-outs 25, the intermediate layers have cut-outs 26 and the upper layers have rectangular cut-outs 27. Depending on the nature of the electronic device being produced, one or more sides of layers 21, 22, 23 and 24 will include electronic circuits formed thereon using conventional techniques and materials.

During the assembly of the lamination using layer 21, 22, 23 and 24, additional sheets are inserted to fill the cavity. These sheets are formed of a "fugitive" material that may be made from the same type of materials as the binder/plasticizer system used in the green LTCC dielectric tape. The fugitive sheets may easily be formed by casting the material onto a flexible film backing such as "MYLAR" to facilitate handling. Upon drying of the cast material, the solidified fugitive material may easily be removed from the MYLAR backing when one wishes to utilize the material. Materials that can be used are a mixture of a polyvinyl butyral resin binder plus a Sanitizer 160 plasticizer. An example of but one suitable formulation for producing the fugitive tape is a mixture comprising about 90 grams polyvinyl butyral, about 8 grams of a solvent such as a mixture comprising 50% by weight ethanol and about 50% by weight methyl isobutyl ketone, and about 2 grams of Santicizer 160 plasticizer. This formulation is cast onto the MYLAR sheets and allowed to dry and solidify or gel the same as when producing a green LTCC dielectric tape. Once the formulation has solidified, it can be cut to size, separated from the MYLAR and utilized to form layers 31, 32 and 33. The illustrated fugitive layers include lower fugitive tape layers 31, intermediate fugitive tape layers 32 and upper fugitive tape layers 33.

It will be appreciated that in addition to using fugitive tape in the cavity 11, one may also use a dough-like material. The dough being inserted (squashed) into the cavity 11 prior to firing of the green LTCC dielectric tape. The dough serves to support the dielectric tape adjoining the cavity during the initial portion of the firing step. An example of a formulation for use in producing the dough is a mixture comprising about 25 grams of cornstarch, about 10 grams of petroleum jelly and about 0.4 grams of Santicizer 160 plasticizer.

The resulting assembly is illustrated in cross-section in FIG. 3. It is important that the inserted pieces 31, 32 and 33 have the same thickness as the ceramic tape layers 21, 22, 23 and 24 to assure dimensional control. It will be seen that the resulting raw laminate 20 has the shelf portions positively supported in a predetermined position to preclude any damage or collapse during assembly. Also, the fugitive tape layers support the product during the initial firing. The dough-like material would perform the same function as the fugitive tape.

The glasses and fillers that are used to make the dielectric sheet are preferably milled to about 1–10 microns average size. The binder may include a solvent, a surfactant and a plasticizer. Typical binders include acrylic components in polyvinyl compounds. Plasticizers may include any of the phthalates. Additionally, viscosity modifiers, anti-skinning agents and the like can be used as is well known in the art.

U.S. Pat. No. 5,258,335 to Muralidhar et al. discloses a method of producing a low temperature co-fired ceramic dielectric green tape. The '335 patent is incorporated herein by reference for its teachings of how to make a low temperature co-fired ceramic (LTCC) dielectric green tape.

Various LTCC dielectric green tape products are commercially available. One example of a commercially available LTCC dielectric green tape product is a tape sold under the trade designation A-6 by the Ferro Corporation of Cleveland, Ohio. Another example of a commercially available LTCC green dielectric tape is DuPont tape sold under the trade designation 851AT.

The resulting raw laminate 20 is fired or heated to a sintering temperature from about 800° C. to about 950° C. to fuse the perforated sheets (and to burn off the binder) and also to burn off the fugitive insert layers, 31, 32 and 33.

Subsequent to firing the resulting product is the ceramic article 10 illustrated in FIG. 1. Resulting cavity 11 can be used to house various type of electronic devices and components, such as, for example, heat sinks, capacitors, semiconductor chips, etc.

As to the particular composition of glasses, fillers and binders utilized to produce the sheets of dielectric green tape, many alternatives may be selected to satisfy different applications of the invention, such as, for example, the firing time and temperature of the structure and the co-efficient of expansion of the ceramic materials.

It will be understood that the method of the invention has been shown and described with respect to a specific embodiment thereof, and other variations and modifications of the specific method herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

I claim:

1. A method for making a ceramic electronic device formed of multiple layers of dielectric tape having a cavity therein and at least one shelf portion protruding laterally into the cavity spaced from the cavity floor comprising the steps of:

constructing a laminated product using strips of dielectric tape comprising fusible ceramic particles and a binder, said strips being cut to predetermined dimensions and superposed so as to define a cavity with a floor and side walls, and with at least one horizontal shelf portion extending from a side wall into said cavity, said shelf portion being spaced above said floor;

filling said cavity during the construction of said laminated product with a fugitive insert to support said shelf portion, said fugitive insert comprising multiple strips of tape formed of an evanescent material having approximately the same thickness as said strips of dielectric tape so as to provide the laminated product comprising multiple strips of said dielectric tape and said cavity filled with multiple strips of said tape formed of an evanescent material; and firing said laminated product to fuse said ceramic particles of said dielectric tape and to burn off said fugitive insert to provide a ceramic article with a cavity and a shelf parallel to the cavity floor.

2. A method as defined in claim 1 wherein said evanescent material comprises a binder/plasticizer system.

3. A method as defined in claim 1 wherein said evanescent material comprises an organic flour and a plasticizer.

* * * * *